(12) United States Patent
Chang et al.

(10) Patent No.: US 10,581,036 B2
(45) Date of Patent: Mar. 3, 2020

(54) PACKAGE STRUCTURE OF SOFT PACKAGE LITHIUM BATTERY

(71) Applicant: CHANGS ASCENDING ENTERPRISE CO., LTD., Taichung (TW)

(72) Inventors: Tsun-Yu Chang, Taichung (TW); Chun-Chieh Chang, Taichung (TW)

(73) Assignee: Changs Ascending Enterprise Co., Ltd., Taichung (TW)

( * ) Notice: Subject to any disclaimer, the term of this patent is extended or adjusted under 35 U.S.C. 154(b) by 529 days.

(21) Appl. No.: 14/648,833

(22) PCT Filed: Apr. 23, 2015

(86) PCT No.: PCT/CN2015/077296
§ 371 (c)(1),
(2) Date: Jun. 1, 2015

(87) PCT Pub. No.: WO2016/169025
PCT Pub. Date: Oct. 27, 2016

(65) Prior Publication Data
US 2017/0149029 A1 May 25, 2017

(51) Int. Cl.
*H01M 2/08* (2006.01)
*H01M 2/02* (2006.01)
(Continued)

(52) U.S. Cl.
CPC ............ *H01M 2/08* (2013.01); *H01M 2/021* (2013.01); *H01M 2/0267* (2013.01); *H01M 2/0277* (2013.01); *H01M 2/0285* (2013.01); *H01M 2/0287* (2013.01); *H01M 2/06* (2013.01); *H01M 2/30* (2013.01); *H01M 10/052* (2013.01)

(58) Field of Classification Search
CPC ............................ H01M 2/08; H01M 2/0267
See application file for complete search history.

(56) References Cited

U.S. PATENT DOCUMENTS

2012/0244421 A1* 9/2012 Yamazaki ............. H01M 2/021
429/176

FOREIGN PATENT DOCUMENTS

| CN | 102593504 A | 7/2012 |
|---|---|---|
| CN | 202940278 U | 5/2013 |
| JP | 4069565 B2 | 4/2008 |

* cited by examiner

*Primary Examiner* — Stewart A Fraser
*Assistant Examiner* — Victoria H Lynch
(74) *Attorney, Agent, or Firm* — Muncy, Geissler, Olds & Lowe, P.C.

(57) ABSTRACT

A package structure of a soft package lithium battery is provided. Two joining sheets that are correspondingly joined are provided at positions at which peripheries of covering films are press-fit on each tab. Each of the joining sheets has a first press-fit area and a second press-fit area. Joining surfaces of the first press-fit areas of the two joining sheets are correspondingly joined to each other and fixedly sandwich the tab therebetween. The second press-fit area is folded downward away from the tab to the first press-fit area, and the second press-fit areas are press-fit and fixed to the covering films. The concave surface formed by folding between the first press-fit area and the second press-fit area of each of the joining sheets alleviates the problem that hot gases generated during battery discharging exerts an upward force to generate a gap at the press-fit position and lead to electrolyte leakage.

5 Claims, 6 Drawing Sheets

(51) Int. Cl.
*H01M 2/06* (2006.01)
*H01M 2/30* (2006.01)
*H01M 10/052* (2010.01)

Fig.1

PRIOR ART

Fig.2

PRIOR ART

PACKAGE STRUCTURE OF SOFT PACKAGE LITHIUM BATTERY

TECHNICAL FIELD

The present invention relates to a package structure of a lithium battery, and particularly to a package structure of a soft package lithium battery.

BACKGROUND

In the past, electronic products requiring high power such as automobiles, mobile phones, and notebook computers generally use nickel-cadmium batteries or lead-acid batteries. However, lead and cadmium metals generated by such batteries easily pollute the environment; therefore, nowadays most electronic products use lithium-ion batteries instead. Lithium batteries can be classified into primary batteries that use lithium metal or a lithium alloy as the negative electrode material and use a non-aqueous electrolyte solution and rechargeable batteries that generate electricity by means of movement of lithium ions between the positive electrode and the negative electrode. The batteries commonly used in the 3C industry and the automobile industry are lithium ion batteries, briefly referred to as lithium batteries.

Figure 1:
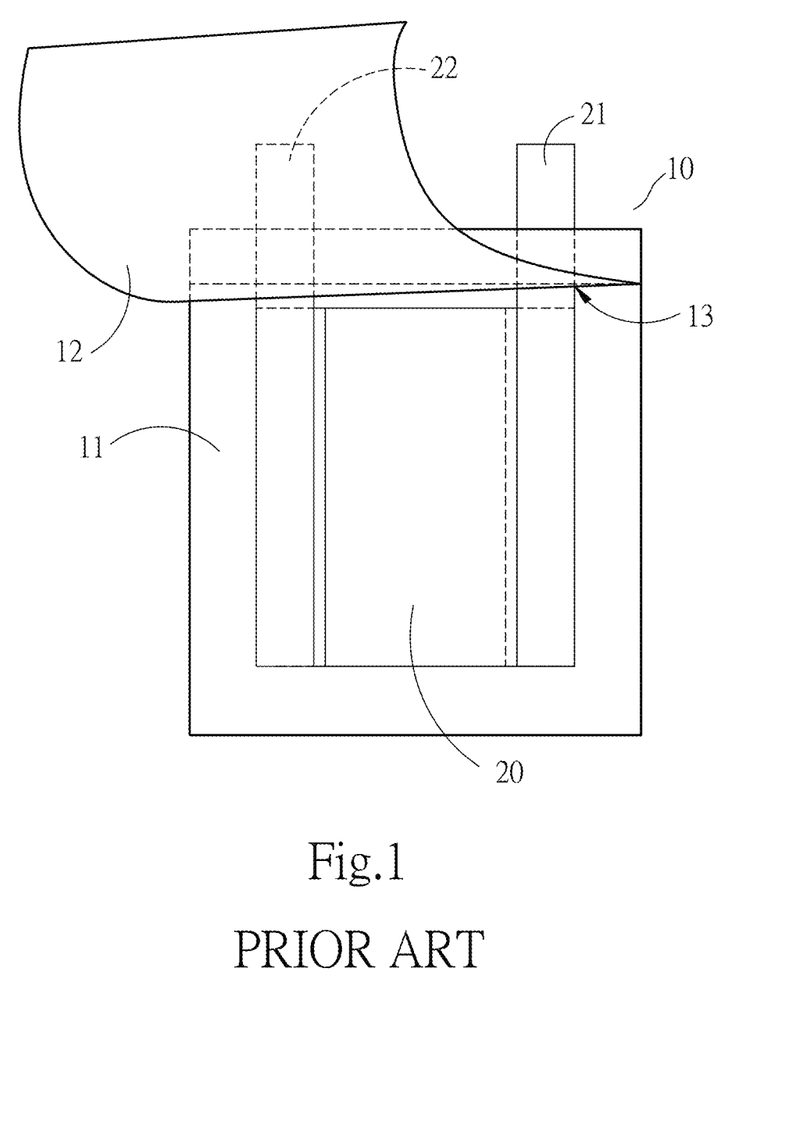
FIG. 1 is a schematic view of a package structure of a lithium battery in the prior art.
Figure 2:
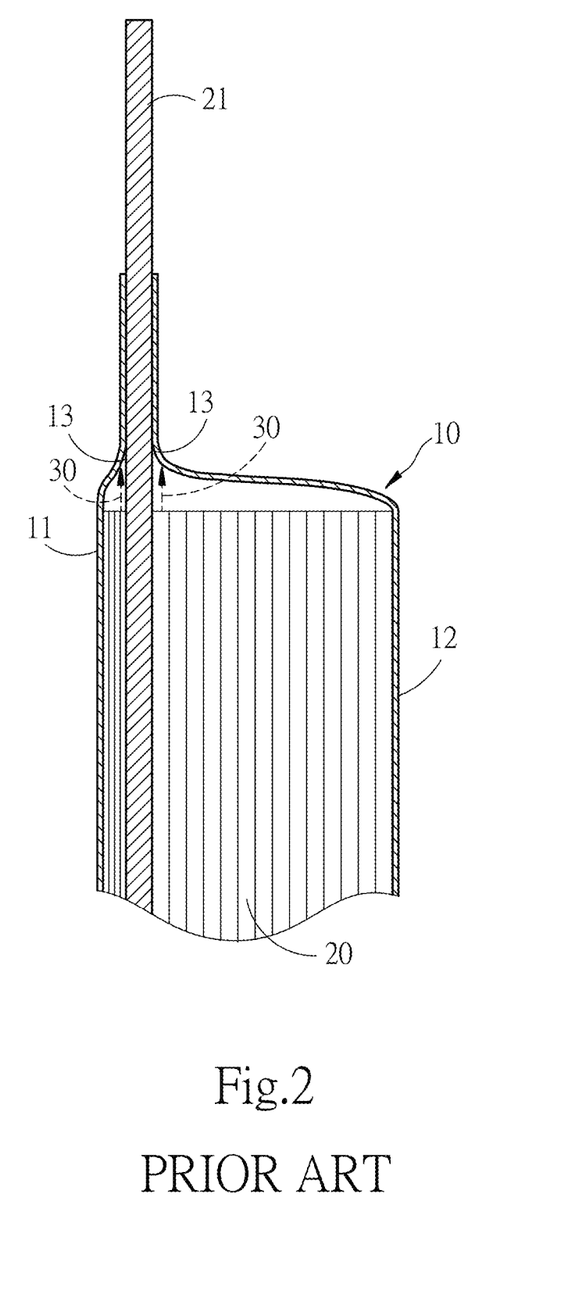
FIG. 2 is a sectional view of a package structure of a lithium battery in the prior art.

FIG. 1 and FIG. 2 are a schematic view and a sectional view of a package structure of a soft package lithium battery in the prior art. A lithium battery in the prior art mainly includes a soft case 10. In existing products, the soft case 10 is mostly formed by correspondingly joining two aluminum composite films 11 and 12. Commonly used aluminum composite films 11 and 12 each have an adhesive layer on its inner side, and the adhesive layer becomes sticky after being melted by heat; therefore, the peripheries of the two aluminum composite films 11 and 12 can be laminated by means of a hot press lamination process.

An electrode plate set 20 and tabs 21 and 22 for electrical conduction of the positive electrode and the negative electrode are wrapped in the soft case 10, and the tabs 21 and 22 are partially exposed out of the soft case 10. In practice, the electrode plate set 20 consists of a plurality of positive electrode plates and a plurality of negative electrode plates. Then the tabs 21 and 22 are respectively electrically connected to positive and negative lugs of the electrode plate set 20. Finally, the peripheries of the two aluminum composite films 11 and 12 are directly press-fit by means of hot press lamination. A bonding adhesive may be additionally provided on sealing portions 13 on an upper surface and a lower surface of the tabs 21 and 22 for electrical conduction of the positive electrode and the negative electrode, so that an airtight effect is achieved when the aluminum composite films 11 and 12 are press-fit to the tabs 21 and 22; alternatively, the aluminum composite films 11 and 12 are respectively adhered to the sealing portions 13 on the upper and lower surfaces of the tabs 21 and 22 directly by means of hot press lamination.

However, in the charging/discharging process, gases generated inside the lithium battery due to overheat cause the soft case 10 to expand, and the gases form an outward stress 30. At the sealing portions 13 of the aluminum composite films 11 and 12 that are connected to the tabs 21 and 22, the stress 30 continuously impacts on the sealing portions 13, and because in this case the outward expanding direction of the aluminum composite films 11 and 12 is the same as the stripping direction, the stress 30 has a direct impact on the bonding effect of the aluminum composite films 11 and 12 at the sealing portions 13. In addition, the adhesive becomes soft due to the hot gases and starts to flow with reduced stickiness, which, together with the impact of the stress 30, leads to that pores are easily formed on the sealing portions 13 of the aluminum composite film 11 that cover the tabs 21 and 22. As a result, the electrolyte inside the soft case 10 flows out from the pores, causing damage to the battery and greatly reducing the service life of the battery.

SUMMARY

Accordingly, to solve the problem of insufficient stress at the sealing portions of the exposed tabs in the package structure of a soft package lithium battery in the prior art, the present invention provides, at the press-fit position of each tab, two joining sheets that are correspondingly joined, so as to enhance the bonding effect at the press-fit position of the tab, and resist the stress of gases generated inside the soft package lithium battery due to overheat in the charging/discharging process.

To achieve the above objective, the present invention discloses a package structure of a soft package lithium battery, applied to press-fit peripheries of two covering films to form a soft case to wrap an electrode plate set of a lithium battery and two tabs electrically connected to two lugs of the electrode plate set, the two tabs being partially exposed out of the soft case, where: two joining sheets that are correspondingly joined are provided at the positions at which the peripheries of the covering films are press-fit on each of the tabs, each of the joining sheets has a first press-fit area and a second press-fit area, joining surfaces of the first press-fit areas of the two joining sheets are correspondingly joined to each other and fixedly sandwich the tab therebetween, and middle segments of the first press-fit areas of the two joining sheets are respectively joined to two surfaces of the tab; and the second press-fit area is located above the first press-fit area, the second press-fit area of each of the joining sheets is folded downward away from the tab to the first press-fit area, and the second press-fit areas are respectively press-fit connected and fixed to the covering films.

The first press-fit area and the second press-fit area of each of the joining sheets are of the same area, and the width of the second press-fit area of each of the joining sheets is the same as the width of the press-fit part of the periphery of the covering films.

The middle segment of the first press-fit area of each of the joining sheets extends downward along the tab to form a third press-fit area, and the width of the third press-fit area is greater than the width of the tab, so that the third press-fit areas of the joining sheets on the two surfaces of the tab are correspondingly joined to each other and fixedly sandwich the tab therebetween, so as to enhance the bonding and fixing effects.

The covering films are aluminum composite films or plastic composite films, the covering films each have an adhesive layer on its inner side, the adhesive layer becomes sticky after being melted by heat, and the corresponding two covering films can be press-fit by means of hot press lamination.

The advantages of the present invention lie in that two joining sheets that are correspondingly joined are provided at the positions at which the peripheries of the covering films are press-fit on each of the tabs, a concave portion corresponding to hot gases inside the soft case is formed by folding between the first press-fit area and the second press-fit area of each joining sheet, and because the first press-fit area and the second press-fit area of the joining sheet are integrally formed, the concave portions have a better physical structure than that in the prior art, which increases the stress of the covering films at the press-fit positions of the tabs, and therefore resists the upward stress exerted by hot gases generated during battery discharging, thereby avoiding the problem of electrolyte leakage of the soft package lithium battery, and prolonging the service life of the battery.

DETAILED DESCRIPTION OF DISCLOSED EMBODIMENTS

The detailed content and technical description of the present invention are further illustrated through embodiments, but it should be understood that these embodiments are described by way of example only, and should not be construed as limiting the implementation of the present invention.

Figure 3:
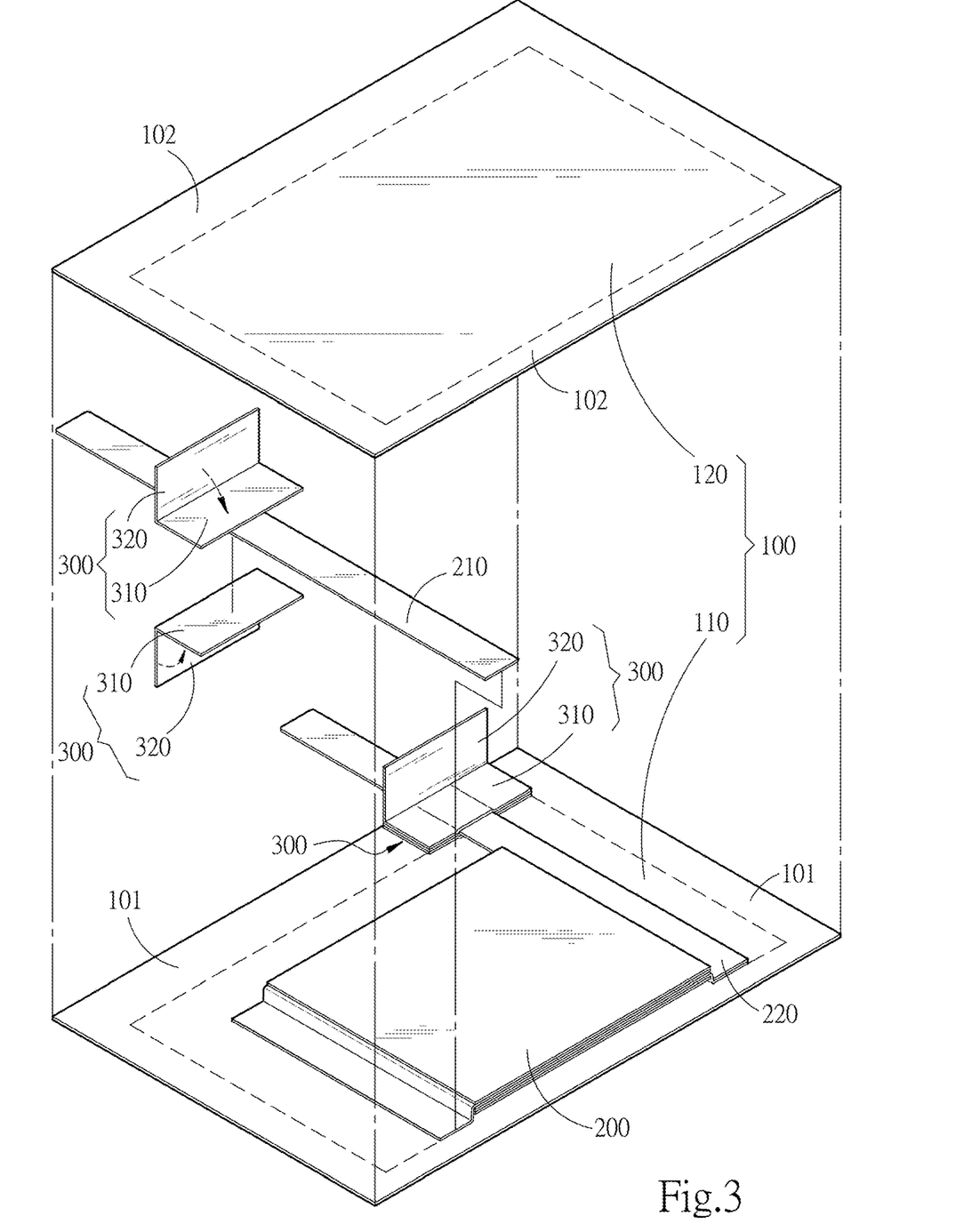
FIG. 3 is a first schematic exploded view of a package structure of a lithium battery according to the present invention.
Figure 4:
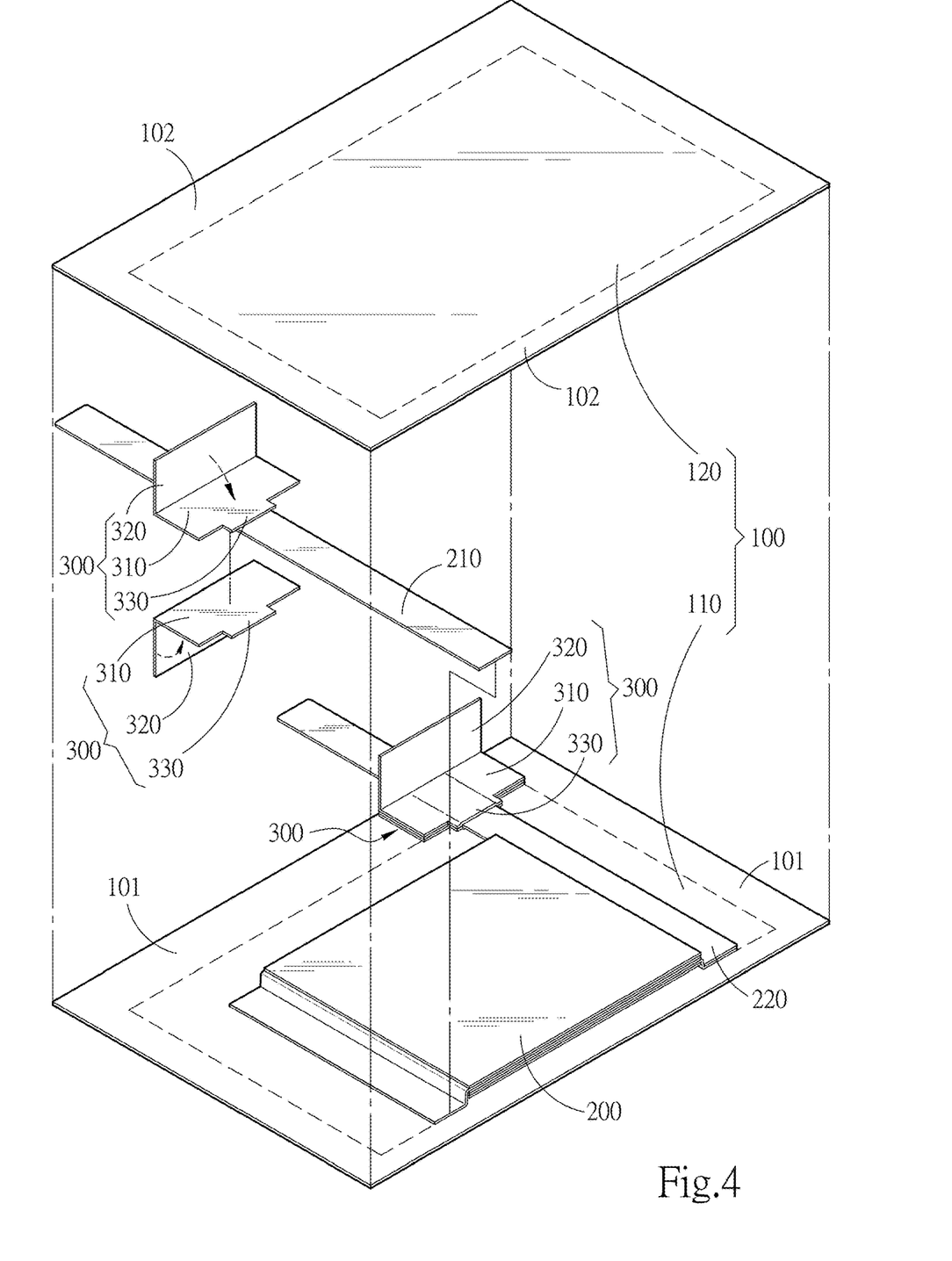
FIG. 4 is a second schematic exploded view of a package structure of a lithium battery according to the present invention.

FIG. 3 and FIG. 4 are schematic views of a package structure of a soft package lithium battery according to the present invention. The present invention discloses a package structure of a soft package lithium battery, in which press-fit positions 101 and 102 at peripheries of two covering films 110 and 120 are correspondingly joined to form a soft case 100. The covering films 110 and 120 are aluminum composite films or plastic composite films, a joining surface with an adhesive layer is provided on the inner side of each of the covering films 110 and 120, the adhesive layer becomes sticky after being melted by heat, and therefore the joining surfaces that correspondingly are in contact with each other around the two covering films 110 and 120 can be joined and fixed by means of hot press lamination.

The soft case 100 is used for wrapping an electrode plate set 200 of a lithium battery and two tabs 210 and 220 electrically connected to two lugs of the electrode plate set 200, and the two tabs 210 and 220 are partially exposed out of the soft case 100. This exemplary implementation is described through an example where the two tabs 210 and 220 are on a same side of the soft case 100.

The present invention is characterized in that two joining sheets 300 that are correspondingly joined are provided at the positions at which the press-fit positions 101 and 102 at the peripheries of the covering films 110 and 120 are press-fit on each of the tabs 210 and 220. In a most preferred implementation, the joining sheets 300 and the covering films 110 and 120 are made of a same material by cutting.

Each of the joining sheets 300 has a first press-fit area 310 and a second press-fit area 320. Two surfaces of each of the tabs 210 and 220 are respectively sandwiched by the first press-fit areas 310 of the two joining sheets 300. The joining surfaces with the adhesive layers of the first press-fit areas 310 of the two joining sheets 300 are correspondingly joined and fixedly sandwich the tab 210 (220) therebetween. Middle segments of the first press-fit areas 310 are respectively joined to the two surfaces of the tab 210 (220). The second press-fit area 320 is located above the first press-fit area 310. The second press-fit areas 320 are respectively folded downward away from the tab 210 (220) to the first press-fit area 310, that is, a downwardly concave portion is formed between the first press-fit area 310 and the second press-fit area 320, and in this case, the joining surfaces with the adhesive layers of the second press-fit areas 320 of the two joining sheets 300 face the outside, and the second press-fit areas 320 can be respectively press-fit and fixed corresponding to the press-fit positions 101 and 102 at the peripheries of the covering films 110 and 120.

The middle segment of the first press-fit area 310 of each of the joining sheets 300 extends downward along the tab 210 (220) to form a third press-fit area 330 (as shown in FIG. 4), and the width of the third press-fit area 330 is greater than the width of the tab 210 (220), so that the third press-fit areas 330 of the joining sheets 300 on the two surfaces of the tab 210 (220) are correspondingly joined to each other and fixedly sandwich the tab 210 (220) therebetween, so as to enhance the bonding and fixing effects.

In practice, a bonding adhesive may be additionally provided on the upper and lower surfaces of the tabs 210 and 220, the bonding adhesive is disposed at the middle segment of the first press-fit area 310 and the third press-fit area 330 of each of the joining sheets 300, so that an airtight effect is achieved when the joining sheets 300 on the tabs 210 and 220 are joined.

In practice, the first press-fit area 310 and the second press-fit area 320 of each of the joining sheets 300 are most preferably of a same area, and the width of the second press-fit area 320 of each of the joining sheets 300 is most preferably the same as the width of the press-fit positions 101 and 102 of the peripheries of the two covering films 110 and 120.

Figure 5:
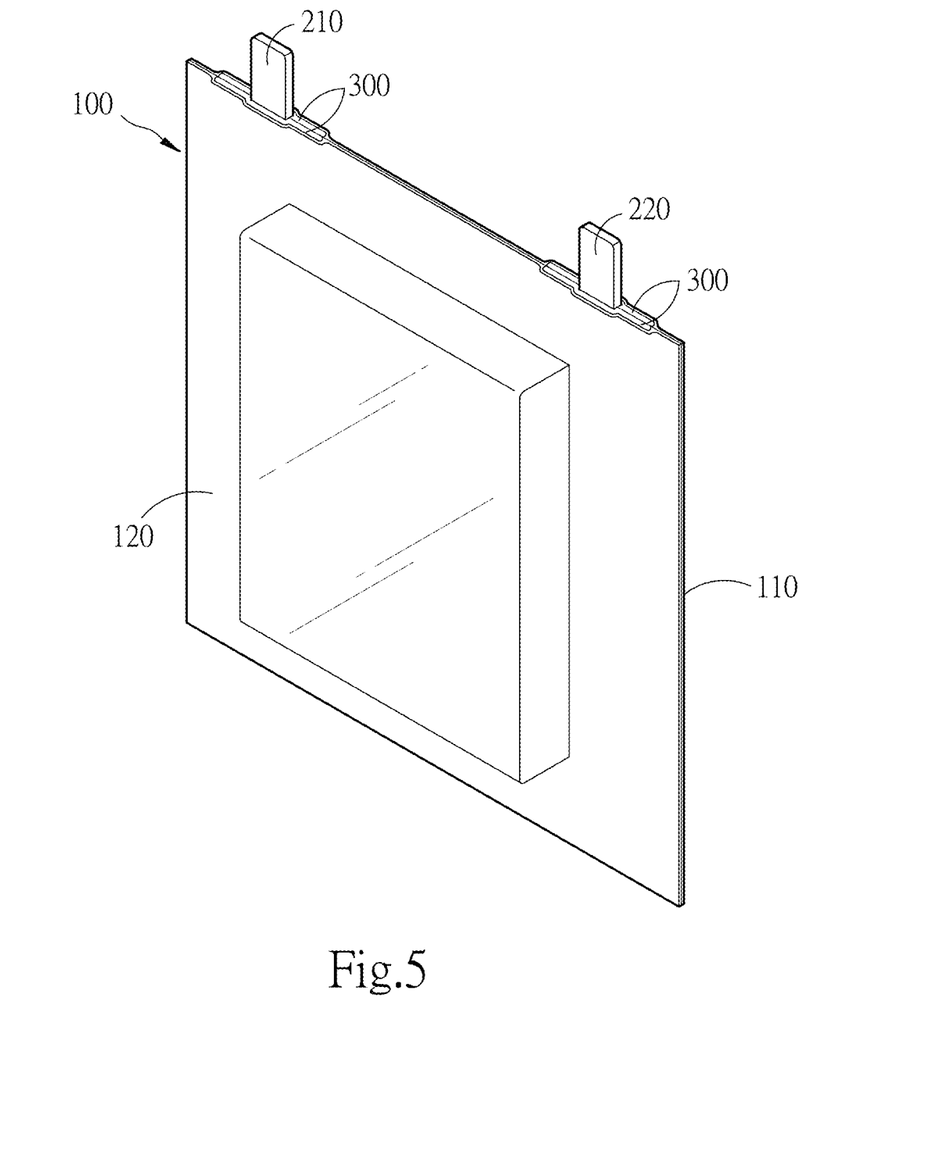
FIG. 5 is a three-dimensional schematic view of a package structure of a lithium battery according to the present invention.
Figure 6:
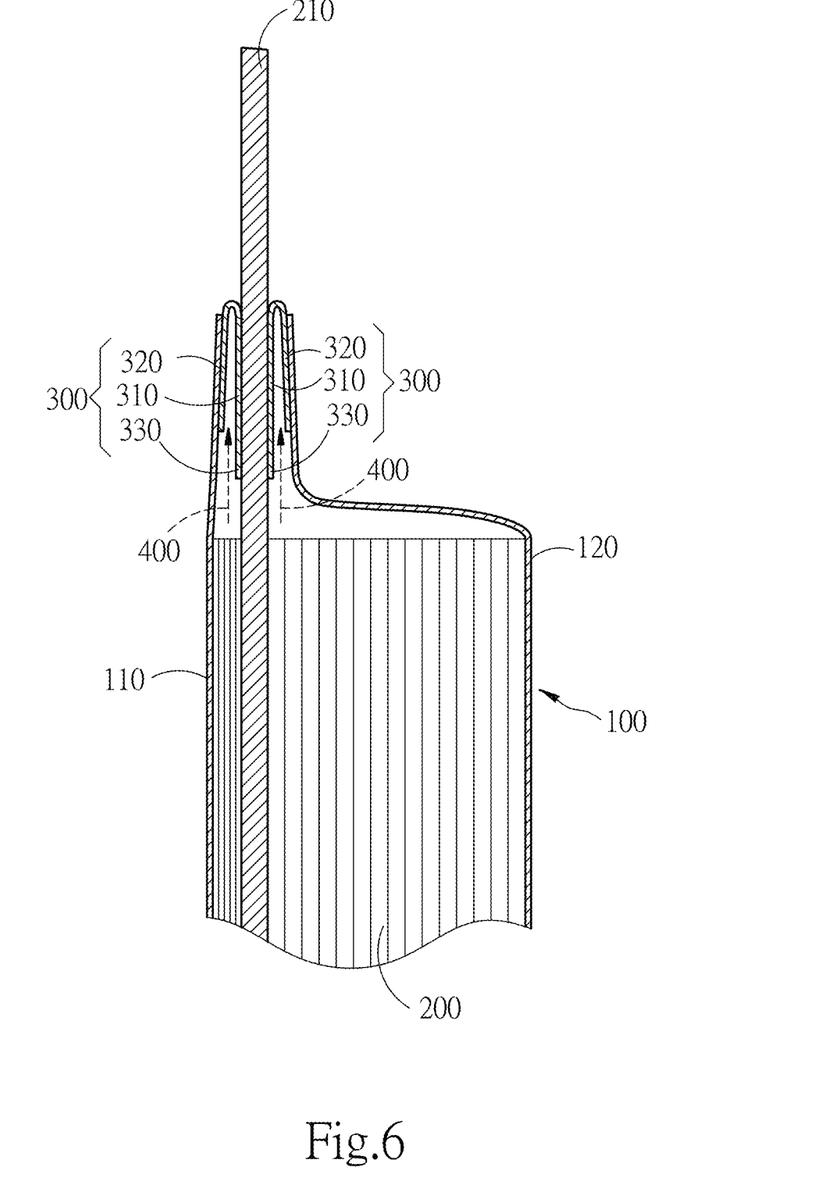
FIG. 6 is a schematic sectional view of a package structure of a lithium battery according to the present invention.

Further, referring to FIG. 5 and FIG. 6, in the present invention, packaging of the soft case 100 can be completed by performing hot press lamination according to a known press-fit procedure, thereby obtaining the package structure of a soft package lithium battery. In this way, two joining sheets 300 that are correspondingly joined are provided at the positions at which the two tabs 210 and 220 are exposed at the peripheries of the soft case 100, and at the positions at which the peripheries of the covering films 110 and 120 are press-fit on each of the tabs 210 and 220.

When gases are generated inside the lithium battery due to overheat in the charging/discharging process and cause the soft case 100 to expand, the gases inside the soft case 100 form an outward stress 400. At the press-fit positions of the tabs 210 and 220 (the tab 210 is illustrated by way of example in FIG. 6), the concave portion between the first press-fit area 310 and the second press-fit area 320 of the joining sheet 300 has a better bonding effect that that obtained by direct joining in the prior art, the stripping direction at the junctions between the joining sheet 300 and the tabs 210 and 220 as well as the covering films 110 and 120 is opposite to the direction of the stress 400, and the joining sheet 300 is respectively bonded to the tabs 210 and 220 and the covering films 110 and 120 by means of the first press-fit area 310 and a second press-fit area 320, which provides a larger joining area than that in the prior art. In this way, because the two joining sheets 300 that are joined to each other are provided at the positions at which the covering films 110 and 120 are press-fit on each of the tabs 210 and 220, the structural strength is desirably enhanced. As the structural strength is enhanced by the joining sheets 300, the outward expansion of the soft case 100 at each of the tabs 210 and 220 can be further resisted, thereby alleviating the problem that gases generated during battery discharging exerts an upward force to generate a gap and lead to electrolyte leakage, and prolonging the service life of the battery.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A package structure of a soft package lithium battery, applied to press-fit peripheries of two covering films to form a soft case to wrap an electrode plate set of a lithium battery and two tabs electrically connected to two lugs of the electrode plate set, the two tabs being partially exposed out of the soft case, wherein:

two joining sheets that are correspondingly joined are provided at the positions at which the peripheries of the covering films are press-fit on each of the tabs, each of the joining sheets has a first press-fit area and a second press-fit area, joining surfaces with adhesive layers of the first press-fit areas of the two joining sheets are correspondingly joined to each other and fixedly sandwich the tab therebetween, and middle segments of the first press-fit areas of the two joining sheets are respectively joined to two surfaces of the tab; and the second press-fit area is located above the first press-fit area, the second press-fit area of each of the joining sheets is folded downward away from the tab to the first press-fit area, concave portion is formed between the first press-fit area and the second press-fit area without the adhesive layers, and the second press-fit areas having the joining surfaces with the adhesive layers are respectively press-fit connected and fixed to the covering films, the concave portion formed between the first press-fit area and the second press-fit area is in the soft case.

2. The package structure of a soft package lithium battery according to claim 1, wherein the first press-fit area and the second press-fit area of each of the joining sheets are of the same area.

3. The package structure of a soft package lithium battery according to claim 1, wherein the width of the second press-fit area of each of the joining sheets is the same as the width of the press-fit part of the periphery of the covering films.

4. The package structure of a soft package lithium battery according to claim 1, wherein the middle segment of the first press-fit area of each of the joining sheets extends downward along each of the tabs to form a third press-fit area, and the width of the third press-fit area is greater than the width of each of the tabs, so that the third press-fit areas of the joining sheets on the two surfaces of each of the tabs are correspondingly joined to each other and fixedly sandwich each of the tabs therebetween.

5. The package structure of a soft package lithium battery according to claim 1, wherein the joining sheets and the covering films are made of a same material.

\* \* \* \* \*